United States Patent
Esale et al.

(10) Patent No.: US 9,178,798 B2
(45) Date of Patent: Nov. 3, 2015

(54) FAST REROUTE USING LOOP FREE ALTERNATE NEXT HOPS FOR MULTIPOINT LABEL SWITCHED PATHS

(75) Inventors: Santosh Esale, Sunnyvale, CA (US); Ted Qian, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 85 days.

(21) Appl. No.: 13/467,610

(22) Filed: May 9, 2012

(65) Prior Publication Data

US 2013/0301403 A1 Nov. 14, 2013

(51) Int. Cl.
| | |
|---|---|
| *H04L 12/26* | (2006.01) |
| *H04L 12/761* | (2013.01) |
| *H04L 12/707* | (2013.01) |
| *H04L 12/703* | (2013.01) |
| *H04L 12/723* | (2013.01) |
| *H04L 12/705* | (2013.01) |

(52) U.S. Cl.
CPC ............... *H04L 45/16* (2013.01); *H04L 45/18* (2013.01); *H04L 45/22* (2013.01); *H04L 45/28* (2013.01); *H04L 45/50* (2013.01)

(58) Field of Classification Search
CPC ......... H04L 45/00; H04L 45/16; H04L 45/18; H04L 45/28; H04L 45/22; H04L 45/50; H04L 12/18
USPC ......... 370/221, 225, 228, 242, 328, 329, 389, 370/390, 218, 370; 709/201
See application file for complete search history.

(56) References Cited

U.S. PATENT DOCUMENTS

| | | | |
|---|---|---|---|
| 7,315,510 | B1 | 1/2008 | Owens et al. |
| 8,422,364 | B2 * | 4/2013 | Wijnands et al. ............. 370/228 |
| 2006/0159009 | A1 * | 7/2006 | Kim et al. ...................... 370/216 |
| 2009/0271467 | A1 * | 10/2009 | Boers et al. ................... 709/201 |
| 2011/0305136 | A1 | 12/2011 | Pan et al. |
| 2012/0027013 | A1 | 2/2012 | Napierala |
| 2013/0208582 | A1 * | 8/2013 | Wijnands et al. ............. 370/218 |

OTHER PUBLICATIONS

H3C S9500 Series Routing Switches, 2008, Hangzhou H3C Technologies Co., Ltd.*
Naiming Shen, Discovering LDP Next-Nexthop Labels, 2005, IETF.*
Extended European Search Report dated Jul. 5, 2013 in corresponding EP Application No. 13166183.7, 5 pgs.
Andersson et al. "LDP Specification" Network Working Group, Request for Comments: 5036, Oct. 2007, 136 pgs.

(Continued)

*Primary Examiner* — Kwang B Yao
*Assistant Examiner* — Harun Chowdhury
(74) *Attorney, Agent, or Firm* — Shumaker & Sieffert, P.A.

(57) ABSTRACT

The techniques of this disclosure provide local protection for network traffic in multipoint label switched paths (LSPs) due to link or node failure using loop-free alternate (LFA) next hops. The techniques include establishing a vanilla or point-to-point (P2P) LSP with LFA next hops between routers of a multipoint LSP for use in the event of link or node failure in the multipoint LSP. Upon a failure, the multicast traffic is tunneled between the routers using the P2P LSP with LFA to an alternate next hop with an associated label stack. The techniques of this disclosure define the label stack as including a P2P LSP label as well as a multipoint LSP label. In this way, the P2P LSP with LFA may be used for fast reroute (FRR) of traffic in the multipoint LSP until a convergence process completes for a new multipoint branch of the multipoint LSP.

26 Claims, 6 Drawing Sheets

(56) References Cited

OTHER PUBLICATIONS

Atlas et al. "Basic Specification for IP Fast Reroute: Loop-Free Alternates", Network Working Group, Request for Comments: 5286, Sep. 2008, 32 pgs.

Callon, R. "Use of OSI IS-IS for Routing in TCP/IP and Dual Environments" Network Working Group, Request for Comments: 1195, Dec. 1990, 84 pgs.

Minei et al. "Label Distribution Protocol Extensions for Point-to-Multipoint and Multipoint-to-Multipoint Label Switched Paths draft-ietf-mpls-Idp-p2mp-15", Network Working Group, Internet-Draft, Aug. 4, 2011, 40 pgs.

Moy, J. "OSPF Version 2" Network Working Group, Request for Comments: 2328, Apr. 1998, 215 pgs.

Thomas et al. "LDP Capabilities", Network Working Group, Request for Comments: 5561, Jul. 2009, 13 pgs.

Response to Examination Report dated Jun. 12, 2014, from counterpart European Application No. 13166183.7, filed Oct. 10, 2014, 10 pp.

First Office Action from counterpart European patent application No. 13166183.7, dated Jun. 12, 2014, 4 pp.

* cited by examiner

FAST REROUTE USING LOOP FREE ALTERNATE NEXT HOPS FOR MULTIPOINT LABEL SWITCHED PATHS

TECHNICAL FIELD

The disclosure relates to computer networks and, more particularly, to forwarding network traffic within computer networks.

BACKGROUND

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as a link state protocol Interior Gateway Protocol (IGP).

The connection between two devices on a network is generally referred to as a link. A link state protocol, as one type of IGP, allows routers to exchange and accumulate information describing the various links within the network. With a typical link state routing protocol, the routers exchange information related to available interfaces, metrics and other variables associated with network links. This allows a router to construct its own topology or map of the network. Some examples of link state protocols include the Open Shortest Path First (OSPF) protocol and the Intermediate-System to Intermediate System (IS-IS) protocol.

Upon failure of a link or failure of a node interfacing with the link, routers in the network transmit new connectivity information to neighboring devices, allowing each device to update its local routing table. When a link or node in the network fails, routers using traditional link state protocols may take a long time to adapt their forwarding tables in response to the topological change resulting from link and node failures in the network. The process of adapting the forwarding tables is known as convergence. This time delay occurs because recovery from a failure requires each router to re-compute the shortest path algorithm to calculate the next hop for the affected routers in the network. Until the next hops are re-computed, traffic being sent toward the failed link or node may be dropped.

One approach to reduce failure recovery time is to select an alternate next-hop in addition to the best next-hop for a destination. Along with the best next-hop, the alternate next-hop is installed in the packet forwarding engine. When a link or node failure occurs, the router uses the alternate next-hop for packet forwarding until the shortest path algorithm has re-computed the next hops for the updated network topology and installed the re-computed next hops in the packet forwarding engine.

SUMMARY

In general, the techniques of this disclosure provide local protection for network traffic in multipoint label switched paths (LSPs) due to link or node failure using loop-free alternate (LFA) next hops. The multipoint LSPs may include point-to-multipoint (P2MP) LSPs or multipoint-to-multipoint (MP2MP) LSPs. In this disclosure, the multipoint LSPs may be established using multipoint extensions for the Label Distribution Protocol (mLDP). The techniques include establishing a vanilla or point-to-point (P2P) LSP with LFA next hops between routers of a multipoint LSP for use in the event of link or node failure in the multipoint LSP. Upon a failure, the multicast traffic is tunneled between the routers using the P2P LSP with LFA to an alternate next hop with a label stack. The techniques of this disclosure define the label stack as including a P2P LSP label as well as a multipoint LSP label. In this way, the P2P LSP with LFA may be used for fast reroute (FRR) of traffic in the multipoint LSP until a convergence process completes for a new multipoint branch of the multipoint LSP.

In the case of link protection for multipoint LSPs, the techniques include establishing a targeted adjacency session between routers connected by a protected link of a multipoint LSP. The upstream router installs an LFA next hop in its forwarding table with a label stack including a targeted adjacency session label for the multipoint LSP and a P2P LSP label. In the case of node protection for multipoint LSPs, the techniques include extensions to mLDP that enable allocation of next next hop labels from a downstream router in a multipoint LSP. In this way, an upstream router may receive both a next hop label for a downstream peer router and a next next hop label for a subsequent downstream router of the multipoint LSP. The upstream router then installs an LFA next hop in its forwarding table with a label stack including the next next hop label for the multipoint LSP and a P2P LSP label.

In one example, the disclosure is directed to a method comprising establishing, with an upstream router, a P2P LSP to a downstream router, wherein the upstream router and the downstream router are included in a multipoint LSP, installing an alternate next hop with an associated label stack into forwarding information of the upstream router, wherein the label stack includes a P2P LSP label and a multipoint LSP label, forwarding multicast traffic from the upstream router toward the downstream router along the multipoint LSP, and, upon detecting a failure in the multipoint LSP, tunneling the multicast traffic from the upstream router toward the downstream router along the P2P LSP to the alternate next hop with the associated label stack.

In another example, the disclosure is directed to an upstream router of a multipoint LSP comprising forwarding information that stores a primary next hop for the multipoint LSP and an alternate next hop with an associated label stack for a P2P LSP. The upstream router also comprises a control unit configured to establish the P2P LSP to a downstream router of the multipoint LSP, install the alternate next hop with the associated label stack into the forwarding information, wherein the label stack includes a P2P LSP label and a multipoint LSP label, forward multicast traffic toward the downstream router along the multipoint LSP, and upon detecting a failure in the multipoint LSP, tunnel the multicast traffic toward the downstream router along the P2P LSP to the alternate next hop with the associated label stack.

In a further example, the disclosure is directed to a computer-readable storage medium comprising program instructions for causing a programmable processor to establish, with an upstream router, a P2P LSP to a downstream router, wherein the upstream router and the downstream router are included in a multipoint LSP, install an alternate next hop with an associated label stack into forwarding information of the upstream router, wherein the label stack includes a P2P LSP label and a multipoint LSP label, forward multicast traffic from the upstream router toward the downstream router along the multipoint LSP, and upon detecting a failure in the multipoint LSP, tunnel the multicast traffic from the upstream router toward the downstream router along the P2P LSP to the alternate next hop with the associated label stack.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
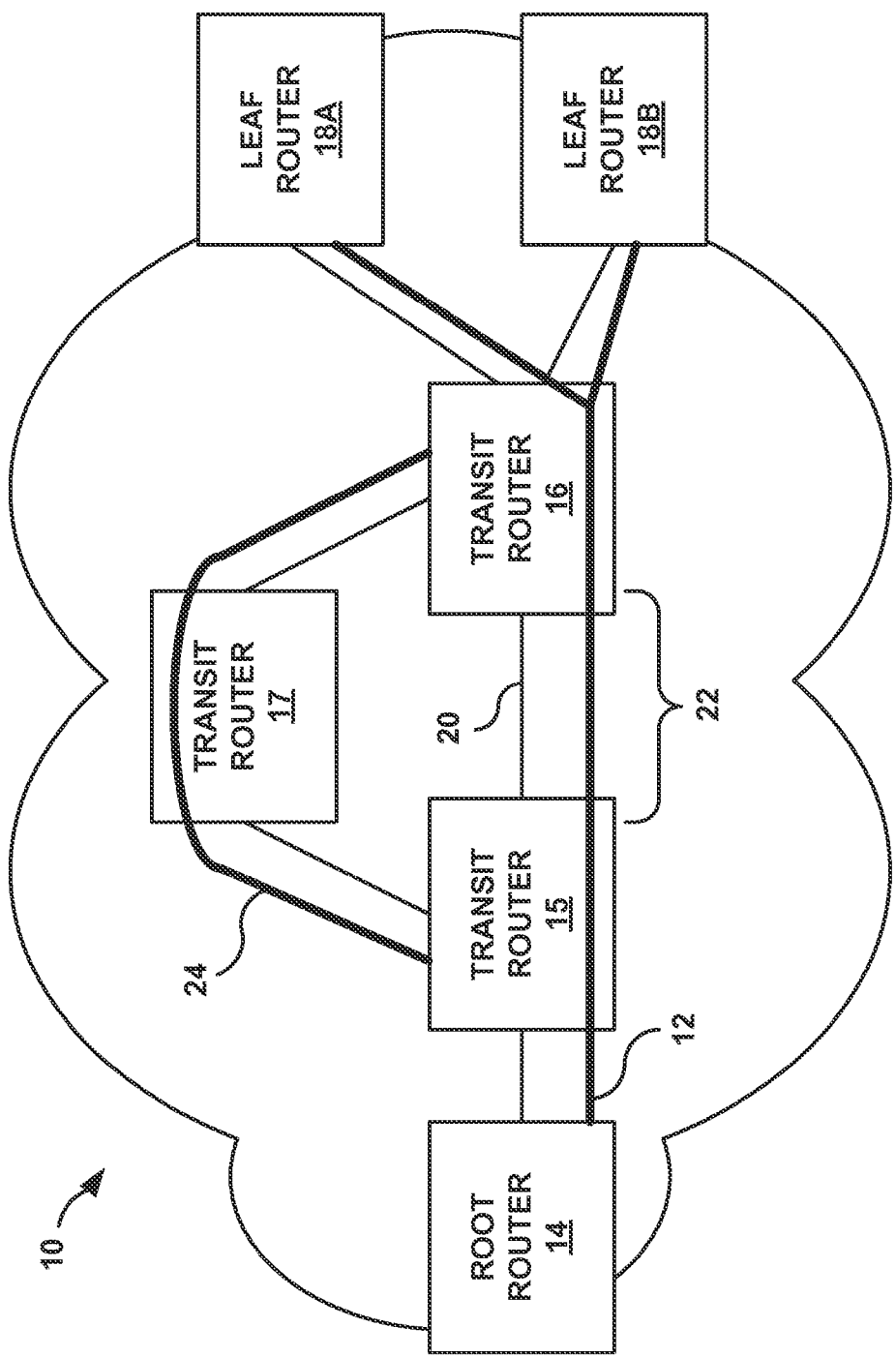
FIG. 1 is a block diagram illustrating an example network including a multipoint LSP established between routers configured to provide link protection using LFA next hops.

FIG. 1 is a block diagram illustrating an example network 10 including a multipoint Label Switched Path (LSP) 12 established between root router 14 and leaf routers 18A and 18B ("leaf routers 18"), configured to provide link protection using loop-free alternate (LFA) next hops. In the illustrated example of FIG. 1, the techniques of this disclosure provide local protection for multicast traffic on link 20 between an upstream transit router 15 and a downstream transit router 16 of multipoint LSP 12.

The techniques include establishing a vanilla or point-to-point (P2P) LSP with LFA next hops 24 between upstream router 15 and downstream router 16 to provide fast reroute (FRR) of multicast traffic in the event of a failure of link 20. LSP with LFA next hops 24 provides an alternate path for the multicast traffic around at least a protected portion of multipoint LSP 12. The alternate path includes LFA next hops, meaning that the next hops of the alternate path will not send the traffic back through the protected portion of multicast LSP 12. Upon the failure of link 20, the multicast traffic is tunneled between upstream router 15 and downstream router 16 along P2P LSP with LFA 24 to an LFA next hop with a label stack including a P2P LSP outer label as well as a multipoint LSP inner label stored in forwarding information of transit router 15.

In some examples, multipoint LSP 12 may comprise a path through network 10 to connect remotely located networks or devices (not shown in FIG. 1). For example, a source network may be connected to root router 14 and subscriber networks may be connected to leaf routers 18. The source network may comprise any public or private network or the Internet that provides multicast traffic to root router 14 in network 10. The subscriber networks may include local area networks (LANs) or wide area networks (WANs) that comprise a plurality of subscriber devices. The subscriber devices may include personal computers, laptops, workstations, personal digital assistants (PDAs), wireless devices, network-ready appliances, file servers, print servers or other devices that access network 10.

Routers 14-18 in network 10 each maintain routing information that describes available routes through network 10. Upon receiving an incoming packet, each of the routers examines information within the packet and forwards the packet in accordance with the routing information. In order to maintain an accurate representation of network 10, the routers exchange routing information, e.g., bandwidth availability of links, in accordance with a defined routing protocol, such as an Interior Gateway Protocol (IGP). For example, each of routers 14-18 may use a link-state routing protocol, such as the Open Shortest Path First (OSPF) protocol or the Intermediate-System to Intermediate System (IS-IS) protocol, to exchange link-state routing information to learn the topology of network 10. Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

In the example of FIG. 1, multipoint LSP 12 through network 10 conforms to a Multi-Protocol Label Switching (MPLS) tunnel and, specifically, comprises a Point-to-Multipoint (P2MP) Label Distribution Protocol (LDP) LSP. In other examples, multipoint LSP 12 may comprise a Multipoint-to-Multipoint (MP2MP) LDP LSP. Routers 14, 15, 16 and 18 utilize multicast extensions to the LDP (mLDP) to establish multipoint LSP 12 and forward multicast traffic over multipoint LSP 12. More information about mLDP may be found in Minei, I., "Label Distribution Protocol Extensions for Point-to-Multipoint and Multipoint-to-Multipoint Label Switched Paths," draft-ietf-mpls-ldp-p2mp-15, Aug. 4, 2011, the entire contents of which are incorporated by reference herein.

In the illustrated example of FIG. 1, root router 14 establishes multipoint LSP 12 through network 10 from root router 14 to leaf routers 18A and 18B. According to the mLDP, the setup of multipoint LSP 12 is initiated by leaf routers 18 and propagated upstream along the shortest upstream path toward root router 14. Downstream routers 15, 16 and 18 may calculate the shortest upstream path toward root router 14 on a hop-by-hop basis based on the routing information maintained by the routers. In addition, mLDP Label Mapping Messages are downstream-assigned such that each downstream router assigns itself a label. Each downstream router then sends an mLDP Label Mapping Message including the assigned label and a multipoint forwarding equivalence class (FEC) identifying multipoint LSP 12 to the selected upstream router for multipoint LSP 12.

In the illustrated example of FIG. 1, after receiving the downstream-assigned label, each of upstream routers 14, 15 and 16 associates the label with a next hop used to transmit packets on multipoint LSP 12 through network 10. Each of routers 14, 15 and 16 may install the next hop for multipoint LSP 12 with the associated label in forwarding information of the router. Upstream routers 14, 15 and 16 then use the next hops with the assigned labels to forward multicast traffic hop-by-hop along multipoint LSP 12 to leaf routers 18. In multipoint LSP 12, transit router 16 acts as a branch router to replicate the multicast traffic and send one copy of the traffic to leaf router 18A and another copy of the traffic to leaf router 18B.

In the event of a link failure in multipoint LSP 12, multicast traffic can no longer reach leaf routers 18 using multipoint LSP 12 according to the next hops previously installed in the routers because the traffic would be dropped at the failed link. For example, after a failure of link 20, any multicast traffic forwarded from transit router 15 to transit router 16 over link 20 to the next hop for multipoint LSP 12 would be dropped. The failure of link 20 detaches the entire multipoint LSP branch beginning at transit router 16 from the upstream portion of multipoint LSP 12 until the routing protocol on transit router 16 converges to determine a new shortest upstream path toward root router 14. In addition to multipoint LSP 12, any other LSPs that use failed link 20 to forward traffic between transit router 15 and transit router 16 will also drop the traffic.

When the link failure occurs, transit router 16, first determines that the upstream interface to router 15 is down, and then recalculates a new shortest upstream path toward root router 14 for multipoint LSP 12. As an example, it may take approximately 300-400 milliseconds (ms) for transit router 16 to determine that the upstream interface to router 15 is down. It may take another approximately 400 ms for the routing protocol on transit router 16 to converge on the new shortest upstream path, and for mLDP to send new label assignments to the new upstream router. In addition, it may take more than several seconds for new upstream router 17, for example, to receive this label and program forwarding for P2MP LSP 12. Router 17 will then select router 15 as its upstream router and send a label assignment to router 15 for P2MP LSP 12. Finally, it may take more than several seconds for upstream router 15 to receive the new label from router 17 and program forwarding for P2MP LSP 12. Afterwards, the traffic will start flowing on the new path. Until new paths are re-calculated, any traffic being sent on failed link 20 will be dropped.

In the case of a unicast or P2P LSP, local link protection may be provided at an upstream router by selecting an alternate path to reach a downstream router of the unicast LSP in the event that the protected link between the routers goes down. The alternate path may comprise an alternate unicast LSP. The upstream router may be referred to as the point of local repair (PLR) router, which is capable of redirecting traffic onto the alternate path, and the downstream router may be referred to at the merge point (MP) router where the alternate path merges with the primary unicast LSP.

The PLR router may install both a primary next hop to reach the MP using the primary unicast LSP and an alternate next hop toward the MP using the alternate path. In some cases, the alternate path may include one or more next hops between the PLR router and the MP router. The alternate path must include loop-free alternate (LFA) next hops, meaning that the next hops of the alternate path will not send the traffic to the MP router on a path that goes back through PLR router and onto the protected link.

When the protected link fails, the PLR router selects the alternate next hop to forward unicast traffic using the alternate path to the MP router to avoid the failed link. The PLR router may use the alternate next hop until the MP router converges on a new shortest upstream path for the updated network topology, and the PLR router installs new primary and alternate next hops in its forwarding information. Fast Reroute (FRR) using LFA is described in more detail in Atlas, A., "Basic Specification for IP Fast Reroute: Loop-Free Alternates," RFC 5286, September, 2008, the entire contents of which are incorporated by reference herein.

As an example, the MP router of the unicast LSP allocates a label L1 to the PLR router of the unicast LSP over the protected link. The MP router may also allocate the same label L1 to a router of the alternate path. In the case of a two-hop alternate path, the router of the alternate path then allocates a label L2 to the PLR router. The PLR router installs a primary next hop with the label L1 to reach the MP router using the primary unicast LSP over the protected link. The PLR router also installs an alternate next hop with label L2 to reach the MP router using the alternate path avoiding the protected link. When the protected link fails, the PLR router forwards the unicast traffic along the alternate path to the alternate next hop with label L2. Upon receiving the unicast traffic with the label L2, the router of the alternate path swaps the label L2 with the label L1 to reach the MP router of the primary unicast LSP.

In the link protection mechanisms for a unicast LSP, the PLR router can switch the unicast traffic from the primary unicast LSP to an alternate path because all paths are capable of carrying unicast traffic without requiring additional setup or capability advertisements. In the case of a multipoint LSP, such as multipoint LSP 12, a PLR router cannot simply forward the multicast traffic onto any alternate path that is not capable of forwarding multicast traffic.

The techniques of this disclosure provide local link and node protection mechanisms for multicast traffic in multipoint LSPs using loop-free alternate (LFA) next hops. More specifically, one or more of upstream routers 14, 15 and 16 may establish alternate paths for the multicast traffic to reach leaf routers 18 in the event of a failure in multipoint LSP 12. The alternate paths comprise vanilla or P2P LSPs with LFA next hops that are calculated, as in the case of unicast LDP LSPs, to be the backup shortest downstream path toward leaf routers 18. The P2P LSPs with LFA next hops comprise vanilla, i.e., simple, P2P LDP LSPs with no LDP enhancements. The P2P LSPs with LFA next hops, therefore, cannot directly forward the multicast traffic for multipoint LSP 12 using the mLDP assigned labels. The P2P LSPs with LFA next hops may, however, tunnel the multicast traffic using P2P LSP labels.

The link protection mechanisms are described with respect to FIG. 1. As an example, upstream transit router 15 may comprise a PLR router for multipoint LSP 12 and downstream transit router 16 may comprise a MP router for multipoint LSP 12. According to the techniques, transit router 15 establishes P2P LSP with LFA 24 from transit router 15 to transit router 16 to provide local link protection to link 20 for multipoint LSP 12. According to LDP, the setup of P2P LSP with LFA 24 is initiated by downstream transit router 16 and propagated upstream along the alternate path toward upstream transit router 15 via transit router 17. As described above, P2P LSP with LFA 24 may comprise a simple P2P LDP LSP with no LDP enhancements such that it is not necessary for transit router 17 to support mLDP capabilities. Transit router 16 allocates an implicit null label or a non-null label to transit router 17 of P2P LSP with LFA 24. Transit router 17, in turn, allocates a non-null label to upstream router 15.

In order to tunnel multicast traffic through P2P LSP with LFA 24, transit router 15 establishes a targeted adjacency session 22 between transit router 15 and transit router 16. For example, transit router 15 may establish targeted adjacency session 22 by periodically sending targeted unicast hello messages to transit router 16 over any link between transit router 15 and transit router 16. In this way, even when link 20 goes down, targeted adjacency session 22 will not go down as long as at least one link remains between transit router 15 and transit router 16 over which the routers may exchange targeted hello messages. Downstream transit router 16 may, therefore, allocate a label for targeted adjacency session 22 instead of for each of the individual links between router 15 and router 16.

Generally, an LDP targeted adjacency established between two routers enables the routers to view each other as LDP neighbors even if the two routers are separated by multiple hops. For example, LDP targeted adjacencies are typically used to establish LDP LSPs across a portion of a network that uses the Resource Reservation Protocol (RSVP). In this case, the downstream router for the LDP LSP may allocate an LDP LSP label to its upstream peer router on the other side of the RSVP portion of the network. The upstream router cannot, however, forward traffic on the LDP LSP using only the LDP LSP label because multiple hops exist between the two routers within the RSVP portion of the network. The LDP targeted adjacency enables the traffic for the LDP LSP to be tunneled through an RSVP LSP with an RSVP LSP label as an "outer label" while maintaining the targeted adjacency session label for the LDP LSP as an "inner label."

According to the techniques described in this disclosure, targeted adjacency session 22 is established between upstream transit router 15 and downstream transit router 16 in order to tunnel the multicast traffic for multipoint LSP 12 through P2P LSP with LFA 24 with the P2P LSP label as the outer label while maintaining the targeted adjacency session label for multipoint LSP 12 as the inner label. In this way, when downstream transit router 16 receives the tunneled multicast traffic from transit router 17 with the targeted adjacency session label, router 16 is able to continue forwarding the multicast traffic along multipoint LSP 12 to the next hops installed in its forwarding information.

When transit router 15 begins tunneling the multicast traffic through P2P LSP with LFA 24 upon the failure of link 20, upstream transit router 15 may start a targeted adjacency expiry timer, referred to as protection expiry, of length greater than a make-before-break (MBB) timer on downstream transit router 16 to tear down targeted adjacency session 22. It may be assumed that downstream transit router 16 will be able to converge and signal the new multipoint LSP branch during the MBB interval. Once the MBB timer on transit router 16 expires, router 16 will withdraw the targeted adjacency session label from old upstream transit router 15, which in turn will stop sending multicast traffic on multipoint LSP 12. The protection expiry timer on transit router 15 will remove targeted adjacency session 22 from its forwarding information.

In order to facilitate proper forwarding of the multicast traffic for multipoint LSP 12, transit router 15 installs a primary next hop with the targeted adjacency session label for multipoint LSP 12 in the forwarding information of upstream transit router 15. According to the techniques of this disclosure, transit router 15 also installs a LFA next hop with a label stack in the forwarding information of upstream transit router 15. The label stack includes the targeted adjacency session label for multipoint LSP 12 and the P2P LSP label.

After the primary and LFA next hops are installed in the forwarding information, upstream transit router 15 forwards multicast traffic along multipoint LSP 12 to the primary next hop with the targeted adjacency session label. Upon detecting that a failure of link 20 has occurred, upstream transit router 15 begins tunneling the multicast traffic to downstream transit router 16 along P2P LSP with LFA 24 to the LFA next hop with the label stack. In this way, during a failure of link 20, upstream transit router 15 tunnels the multicast traffic for multipoint LSP 12 through P2P LSP with LFA 24 to transit router 17 as the LFA next hop with the P2P LSP label as the outer label and the targeted adjacency session label as the inner label. Upon receiving the tunneled multicast traffic, transit router 17 removes the outer P2P LSP label and tunnels the multicast traffic with the targeted adjacency session label through P2P LSP with LFA 24 to downstream router 16.

As described above, downstream router 16 may send an implicit null label for P2P LSP with LFA 24 to transit router 17. In that case, transit router 17 pops the outer P2P LSP label from the multicast traffic and sends the multicast traffic to transit router 16 without another P2P LSP label. Transit router 16 may then act directly on the targeted adjacency session label for multipoint LSP 12. In other examples, downstream router 16 may allocate a non-null label for P2P LSP with LFA 24 to transit router 17. In that case, transit router 17 may send the multicast traffic to transit router 16 with the non-null P2P LSP label as the outer label, and downstream router 16 will first pop the non-null P2P LSP label in order to act on the targeted adjacency session label for multipoint LSP 12.

The techniques of this disclosure enable P2P LSP with LFA 24 to be used for FRR of multicast traffic in multipoint LSP 12 until a convergence process completes for a new path through network 10. The techniques, therefore, reduce packet loss while a routing protocol on the MP router converges on a new multipoint LSP branch for the new topology, and mLDP signals the new multipoint LSP branch to the new upstream routers. If the new upstream routers do not already have the multipoint state for a particular multipoint FEC, the upstream routers signal the new multipoint LSP branch further upstream until it joins the multipoint LSP tree and the multipoint states are installed in forwarding information on all the routers along the new multipoint LSP branch.

As described above, mLDP may setup P2MP LSP 12 by allocating labels from the leaf nodes 18 toward root node 14 according to the smallest upstream metrics of the links. In one example, the path with the smallest upstream metric from downstream router 16 to upstream router 15 may be along the direct link between the routers, i.e., protected link 20. In the case of an asymmetric topology, the smallest downstream metric from upstream router 15 to downstream router 16 may be via router 17. The primary forwarding next hop at router 15 would then be toward router 17, and the alternate forwarding next hop would be directly to router 16. The techniques of this disclosure, however, describe calculating an LFA next hop as an alternate path to a protected link between upstream router 15 and downstream router 16. The LFA next hop described herein is not necessarily the same as the alternate forwarding next hop for router 15.

The techniques of this disclosure are therefore applicable to networks with asymmetric topologies in which metrics on each side of the protected link 20 between upstream router 15 and downstream router 16 are different. The techniques apply to both symmetric and asymmetric topologies because the multicast traffic for multipoint LSP 12 is tunneled along P2P LSP with LFA 24, instead of simply using an alternate next hop label to forward the multicast traffic.

Figure 2:
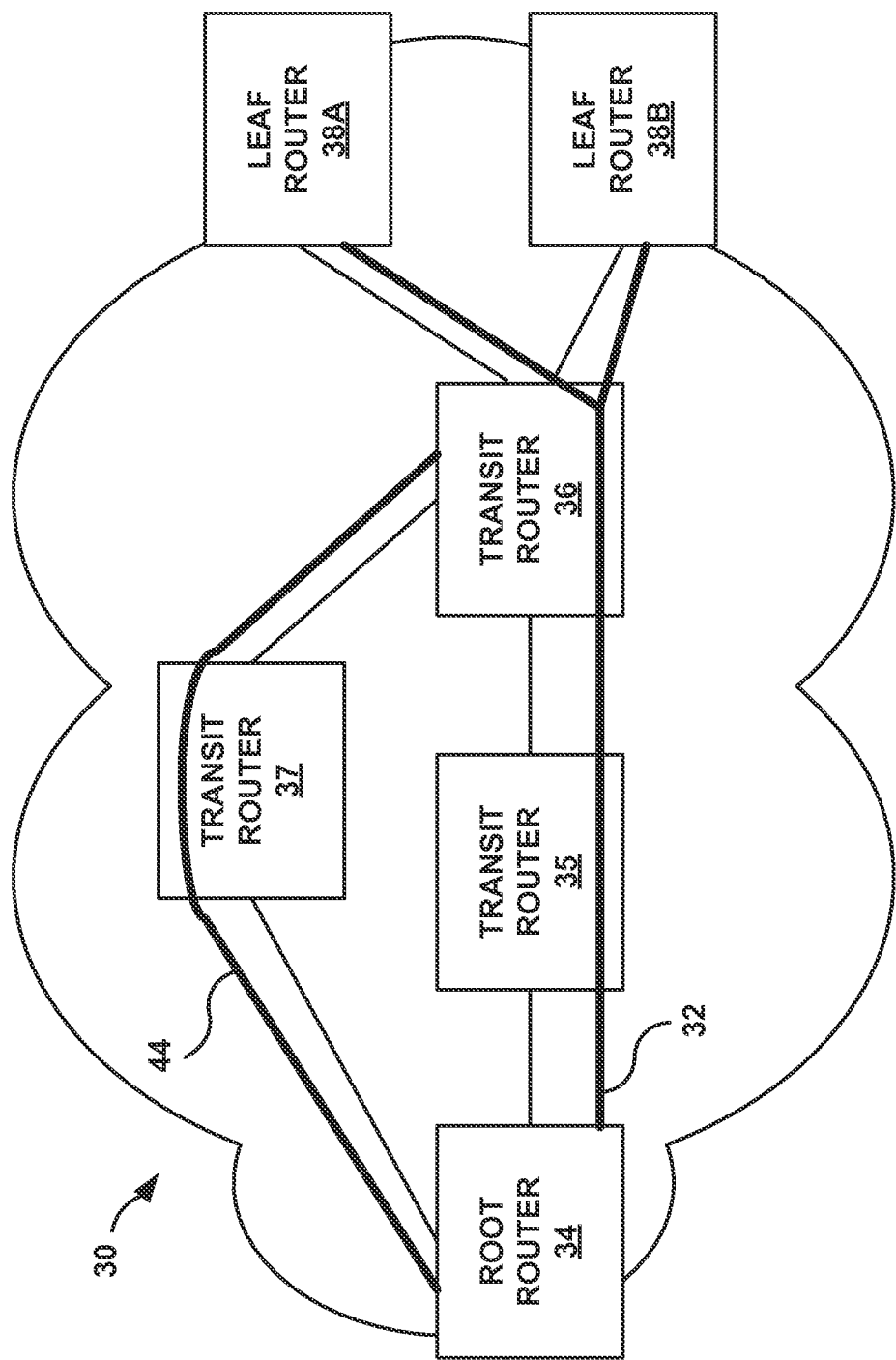
FIG. 2 is a block diagram illustrating another example network including a multipoint LSP established between routers configured to provide node protection using LFA next hops.

FIG. 2 is a block diagram illustrating another example network 30 including a multipoint LSP 32 established between root router 34 and leaf routers 38A and 38B ("leaf routers 38"), configured to provide node protection using LFA next hops. In the illustrated example of FIG. 2, the techniques of this disclosure provide local protection for multicast traffic through intermediate transit router 35 between root router 34 and a downstream transit router 36 of multipoint LSP 32. The techniques include establishing a vanilla or P2P LSP with LFA next hops 44 between root router 34 and downstream router 36 to provide fast reroute (FRR) of multicast traffic in the event of a failure of node 35. Upon the failure of node 35, the multicast traffic is tunneled between root router 34 and downstream router 36 along P2P LSP with LFA 44 to an LFA next hop with a label stack including a P2P LSP outer label as well as a multipoint LSP inner label.

Similar to the multipoint LSP described above with respect to FIG. 1, in some examples, multipoint LSP 32 may comprise a path through network 30 to connect remotely located networks or devices (not shown in FIG. 2). For example, a source network may be connected to root router 34 and subscriber networks may be connected to leaf routers 38. Routers 34-38 in network 30 each maintain routing information that describes available routes through network 10. In the example of FIG. 2, multipoint LSP 32 through network 30 conforms to a MPLS tunnel and, specifically, comprises a P2MP LDP LSP. In other examples, multipoint LSP 32 may comprise a MP2MP LDP LSP.

In the illustrated example of FIG. 2, root router 34 establishes multipoint LSP 32 through network 30 from root router 34 to leaf routers 38A and 38B. According to the mLDP, the setup of multipoint LSP 32 is initiated by leaf routers 38 and propagated upstream along the shortest upstream path toward root router 34. Downstream routers 35, 36 and 38 may calculate the shortest upstream path toward root router 34 on a hop-by-hop basis based on the routing information maintained by the routers. In addition, mLDP Label Mapping Messages are downstream-assigned such that each downstream router assigns itself a label. Each downstream router then sends an mLDP Label Mapping Message including the assigned label and a multipoint forwarding equivalence class (FEC) identifying multipoint LSP 32 to the selected upstream router for multipoint LSP 32.

In the illustrated example of FIG. 2, after receiving the downstream-assigned label, each of upstream routers 34, 35 and 36 associates the label with a next hop used to transmit packets on multipoint LSP 32 through network 30. Each of routers 34, 35 and 36 may install the next hop for multipoint LSP 32 with the associated label in forwarding information of the router. Upstream routers 34, 35 and 36 then use the next hops with the assigned labels to forward multicast traffic hop-by-hop along multipoint LSP 32 to leaf routers 38. At branch router 36, the multicast traffic is replicated and one copy of the traffic is sent to leaf router 38A and another copy of the traffic is sent to leaf router 38B.

In the event of a node failure in multipoint LSP 32, multicast traffic can no longer reach leaf routers 38 using multipoint LSP 32 according to the next hops previously installed in the routers because the traffic would be dropped at the failed node. For example, after a failure of intermediate node 35, any multicast traffic forwarded from root router 34 to node 35 as the installed next hop for multipoint LSP 32 would be dropped. The failure of node 35 detaches the entire multipoint LSP branch beginning at transit router 36 from the upstream portion of multipoint LSP 32 until the routing protocol on downstream transit router 36 converges to determine a new shortest upstream path toward root router 34. In addition to multipoint LSP 32, any other LSPs that use failed intermediate node 35 to forward traffic will also drop the traffic.

When the node failure occurs, transit router 36 first determines that the upstream interface to router 35 is down, and then recalculates a new shortest upstream path toward root router 34 for multipoint LSP 32. As an example, it may take approximately 300-400 milliseconds (ms) for transit router 36 to determine that the upstream interface to router 35 is down. It may take another approximately 400 ms for the routing protocol on transit router 36 to converge on the new shortest upstream path, and for mLDP to send new label assignments to the new upstream router. In addition, it may take more than several seconds for new upstream router 37 to receive this label and program forwarding for P2MP LSP 32. Router 37 will then select router 34 as its upstream router and send a label assignment to router 34 for P2MP LSP 32. Finally, it may take more than several seconds for upstream router 34 to receive the new label from router 37 and program forwarding for P2MP LSP 32. Afterwards, the traffic will start flowing on the new path. Until new paths are re-calculated, any traffic being sent to failed node 35 will be dropped.

The techniques of this disclosure provide local link and node protection mechanisms for multicast traffic in multipoint LSPs using LFA next hops. More specifically, one or more of upstream routers 34, 35 and 36 may establish alternate paths for the multicast traffic to reach leaf routers 38 in the event of a failure in multipoint LSP 32. The alternate paths comprise vanilla or P2P LSPs with LFA next hops that are calculated, as in the case of unicast LDP LSPs, to be the backup shortest downstream path toward leaf routers 38. The P2P LSPs with LFA next hops comprise vanilla, i.e., simple, P2P LDP LSPs with no LDP enhancements. The P2P LSPs with LFA next hops, therefore, cannot directly forward the multicast traffic for multipoint LSP 32 using the mLDP assigned labels. The P2P LSPs with LFA next hops may, however, tunnel the multicast traffic using P2P LSP labels.

The node protection mechanisms are described with respect to FIG. 2. As an example, root router 34 may comprise a PLR router for multipoint LSP 32 and downstream transit router 36 may comprise a MP router for multipoint LSP 32. According to the techniques, root router 34 establishes P2P LSP with LFA 44 from root router 34 to transit router 36 to provide local node protection to transit router 35 for multipoint LSP 32. According to LDP, the setup of P2P LSP with LFA 44 is initiated by downstream transit router 36 and propagated upstream along the alternate path toward root router 34 via transit router 37. As described above, P2P LSP with LFA 44 may comprise a simple P2P LDP LSP with no LDP enhancements such that it is not necessary for transit router 37 to support mLDP capabilities. Transit router 36 allocates an implicit null label or a non-null label to transit router 37 of P2P LSP with LFA 44. Transit router 37, in turn, allocates a non-null label to root router 34.

In order to tunnel multicast traffic through P2P LSP with LFA 44, the techniques of this disclosure include extensions to the mLDP that enable allocation of next next hop labels from a downstream router in a multipoint LSP. The extensions to the mLDP enable routers 34, 35, 36 and 38 to advertise next next hop label capability to neighboring routers in network 30. The extensions to mLDP also enable capable upstream routers 34, 35 and 36 to request next next hop labels from their respective capable downstream peer routers, and capable downstream routers 38, 36 and 35 to send their next hop labels to their respective capable upstream peer routers. In this way, capable upstream routers 34, 35 and 36 may receive both a next hop label for a downstream peer router and a next next hop label for a subsequent downstream router of multipoint LSP 32. Each of upstream routers 34, 35 and 36 then installs an LFA next hop in its forwarding table with a label stack including the next next hop label for the multipoint LSP and a P2P LSP label.

For example, upon establishing multipoint LSP 32, root router 34 advertises its next next hop label capability to its neighboring routers, e.g., transit router 35 and transit router 37, in network 30. Root router 34 also receives next next hop label capability advertisements from one or more of its neighboring routers that support next next hop label capabilities. After receiving the next next hop label capability advertisements, upstream root router 34 may request next next hop labels for multipoint LSP 32 from capable intermediate router 35. In response to the request, upstream root router 34 receives next next hop labels for multipoint LSP 32 from capable intermediate router 35, which includes a next next hop label for downstream branch peer router 36 in multipoint LSP 32. In some cases, both the next hop label and the next next hop label for multipoint LSP 32 may be included in a label mapping message sent from intermediate router 35 to upstream root router 34.

According to the techniques described in this disclosure, the next next hop extensions to the mLDP are provided in order to tunnel the multicast traffic for multipoint LSP 32 through P2P LSP with LFA 44 with the P2P LSP label as the outer label while maintaining the next next hop label given by transit router 36 to failed node 35 for multipoint LSP 32 as the inner label. In this way, when downstream transit router 36 receives the tunneled multicast traffic from transit router 37 with the next next hop label, router 36 is able to continue forwarding the multicast traffic along multipoint LSP 32 to the next hops installed in its forwarding information.

When root router 34 begins tunneling the multicast traffic through P2P LSP with LFA 44 upon the failure of node 35, root router 34 may start a protection expiry timer of length greater than a make-before-break (MBB) timer on downstream transit router 36 to stop tunneling the multicast traffic for P2MP LSP 32 through P2P LSP with LFA 44. Downstream transit router 36 will hold on to the forwarding state via failed router 35 for P2MP LSP 32 until a MBB procedure is complete for P2MP LSP 32. It may be assumed that downstream transit router 36 will be able to converge and signal the new multipoint LSP branch during the MBB interval. Once the MBB timer on transit router 36 expires, router 36 will delete the label assigned to old upstream transit router 35. The protection expiry timer on root router 34 will clean up the old P2MP branch of P2MP LSP 32, which is tunneling multicast traffic through P2P LSP with LFA 44 towards downstream router 36.

In order to facilitate proper forwarding of the multicast traffic for multipoint LSP 32, root router 34 installs a primary next hop with the next hop label for multipoint LSP 32 in the forwarding information of upstream router 34. Root router 34 also installs a LFA next hop with a label stack in the forwarding information of upstream root router 34 where the label stack includes the next next hop label for multipoint LSP 32 and the P2P LSP label.

After the primary and LFA next hops are installed in the forwarding information, upstream root router 34 forwards multicast traffic along multipoint LSP 32 to the primary next hop with the next hop label for multipoint LSP 32. Upon detecting that a failure of node 35 has occurred, upstream root router 34 begins tunneling the multicast traffic around failed intermediate router 35 along the P2P LSP with LFA 44 to the LFA next hop with the label stack. In this way, during a failure of node 35, root router 34 tunnels the multicast traffic for multipoint LSP 32 through P2P LSP with LFA 44 to transit router 37 as the LFA next hop with the P2P LSP label as the outer label and the next next hop label as the inner label. Upon receiving the tunneled multicast traffic, transit router 37 removes the outer P2P LSP label and tunnels the multicast traffic with the next next hop label through P2P LSP with LFA 44 to downstream router 36.

As described above, downstream router 36 may send an implicit null label for P2P LSP with LFA 44 to transit router 37. In that case, transit router 37 pops the outer P2P LSP label from the multicast traffic and sends the multicast traffic to transit router 36 without another P2P LSP label. Transit router 36 may then act directly on the next next hop label for multipoint LSP 32, which is the same label that transit router 36 expects to receive with traffic for multipoint LSP 32 from transit router 35. In other examples, downstream router 36 may allocate a non-null label for P2P LSP with LFA 44 to transit router 37. In that case, transit router 37 may send the multicast traffic to transit router 36 with the non-null P2P LSP label as the outer label, and downstream router 36 will first pop the non-null P2P LSP label in order to act on the next hop label for multipoint LSP 12.

The techniques of this disclosure enable P2P LSP with LFA 44 to be used for FRR of multicast traffic in multipoint LSP 32 until a convergence process completes for a new path through network 30. The techniques, therefore, reduce packet loss while a routing protocol on the MP router converges on a new multipoint LSP branch for the new topology, and mLDP signals the new multipoint LSP branch to the new upstream routers.

Figure 3:
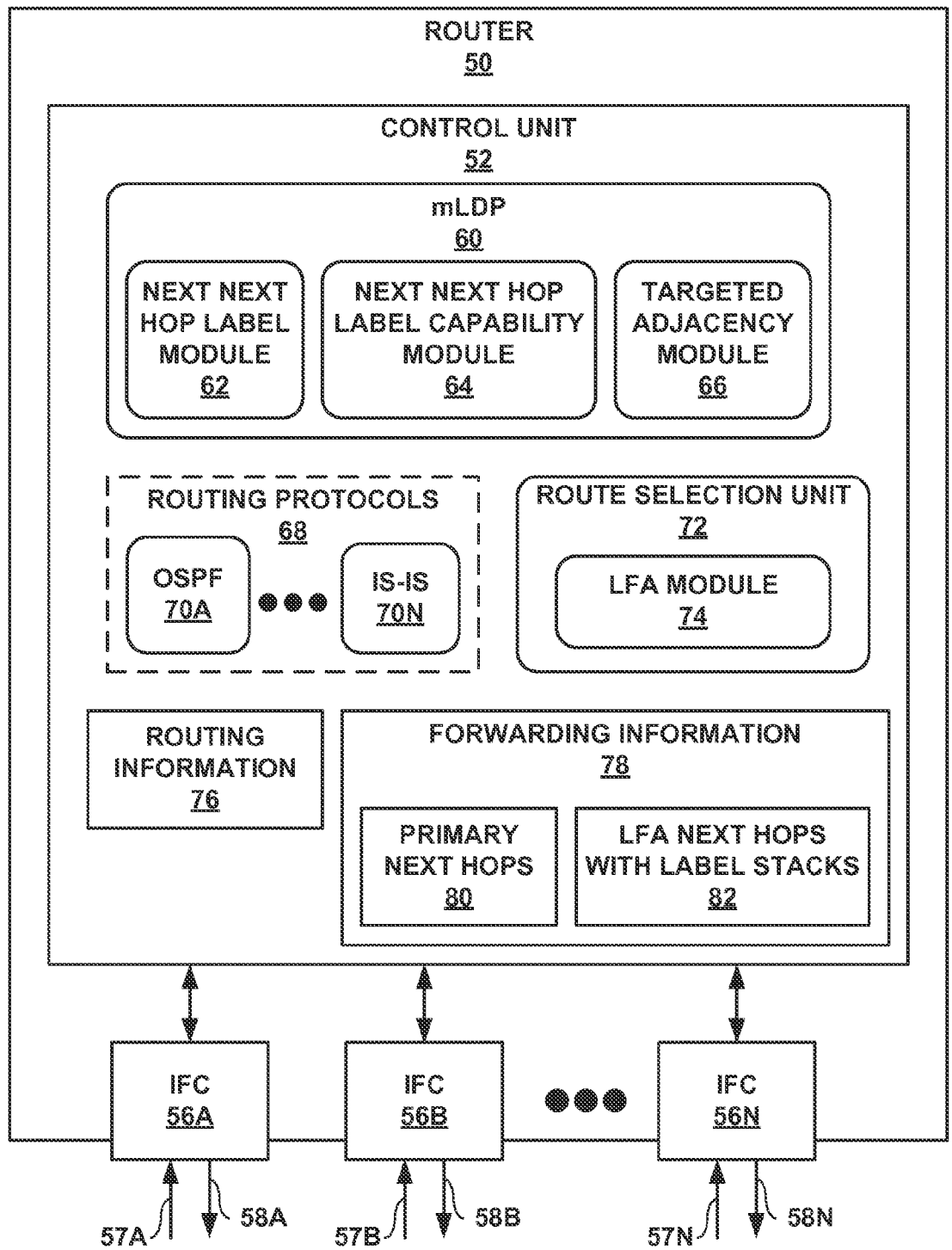
FIG. 3 is a block diagram illustrating an exemplary router capable of supporting fast reroute using LFA next hops to provide link and/or node protection for multipoint LSPs.

FIG. 3 is a block diagram illustrating an exemplary router 50 capable of supporting fast reroute using LFA next hops to provide link and/or node protection for multipoint LSPs. As one example, router 50 may comprise an upstream router or root of a multipoint LSP established across a network. Router 30 may also comprise a downstream router or leaf of a multipoint LSP established across the network by an upstream router. Router 50 may operate to provide link protection as described with respect to FIG. 1, or to provide node protection as described with respect to FIG. 2. Router 50 may operate substantially similar to any of routers 14-18 from FIG. 1 and routers 34-38 from FIG. 2.

In the example illustrated in FIG. 3, router 50 includes interface cards 56A-56N ("IFCs 56") that receive multicast packets via inbound links 57A-57N ("inbound links 57") and send multicast packets via outbound links 58A-58N ("outbound links 58"). IFCs 56 are typically coupled to links 57, 58 via a number of interface ports. Router 50 also includes a control unit 52 that determines routes of received packets and forwards the packets accordingly via IFCs 56.

Control unit 52 maintains routing information 76 that describes the topology of a network and, in particular, routes through the network. Routing information 76 may include, for example, route data that describes various routes within the network, and corresponding next hop data indicating appropriate neighboring devices within the network for each of the routes. Router 50 updates routing information 76 to accurately reflect the topology of the network.

Control unit 52 also maintains forwarding information 78 that associates network destinations with specific next hops and corresponding interface ports. In general, when router 50 receives a multicast packet with a label via one of inbound links 57, control unit 52 determines a destination and associated next hop for the packet in accordance with routing information 76 and forwards the packet on one of outbound links 58 to the corresponding next hop in accordance with forwarding information 78 based on the destination of the packet.

Control unit 52 includes control plane routing protocols 68 comprising software processes executing on one or more processors. In the example of FIG. 3, routing protocols 68 include OSPF 70A and IS-IS 70N. Control unit 52 may include other routing protocols not shown in FIG. 3. Routing protocols 68 interact with a kernel to update routing information 76 based on routing protocol messages received by router 50. In response, route selection unit 72 generates forwarding information 78 based on the network topology represented in routing information 76.

Route selection module 72 and LFA module 74 of router 50 cooperate to compute primary next hops and LFA next hops to downstream routers in the multipoint LSP. Route selection module 72 may run a Shortest Path First (SPF) calculation with router 50 as the source to compute a primary next hop for the closest downstream router of the multipoint LSP. Route selection module 72 runs the SPF calculation based on routing information 76.

To compute the LFA next hop, LFA module 74 computes SPF with router 50 as the source to compute the distance to each neighboring router of router 50. LFA module 74 may then select the next closest downstream router along a P2P LSP toward the same downstream router as the multipoint LSP. According to the techniques of this disclosure, router 50 may establish the P2P LSP with LFA next hops between router 50 and a downstream router to avoid a protected link and/or a protected node in the multipoint LSP.

In the case where router 50 comprises a downstream router or leaf of a multipoint LSP, route selection module 72 may allocate a primary next hop label to an upstream router of the multipoint LSP having the lowest cost distance from router 50. In addition, route selection module 72 may allocate a LFA next hop label to an alternate upstream router of the P2P LSP having the next lowest cost distance from router 50.

In the case where router 50 comprises an upstream router or root of a multipoint LSP, route selection module 72 receives next hop labels from downstream routers in the multipoint LSP, and installs the route to the downstream routers with the next hop labels as primary next hops 80 in forwarding information 78. According to the techniques of this disclosure, LFA module 74 receives P2P LSP labels from alternate downstream routers in the P2P LSP with LFA, and installs the routes to the alternate downstream routers as LFA next hops with label stacks 82 including the P2P LSP labels as outer labels and multipoint LSP labels as inner labels.

In accordance with the techniques of the disclosure, control unit 52 provides an operating environment for mLDP 60 to execute. mLDP 60 includes a next next hop label module 62 and a next next hop label capability module 64 to support next next hop labels. mLDP 60 also includes a targeted adjacency module 66 to support targeted adjacencies with other LDP routers.

As described above with respect to FIG. 1, in order to provide local link protection for a multipoint LSP, the techniques include establishing a targeted adjacency session between routers connected by a protected link of the multipoint LSP. The upstream router installs an LFA next hop in its forwarding table with a label stack including a targeted adjacency session label for the multipoint LSP and a P2P LSP label for the P2P LSP with LFA around the protected link.

In the case where router 50 comprises an upstream router or root of a multipoint LSP, router 50 establishes the multipoint LSP across a network having two or more downstream routers or leaves. According to the techniques, when router 50 requests link protection to its neighboring downstream router in the multipoint LSP and a P2P LSP with LFA is established around the protected link, targeted adjacency module 66 in router 50 establishes a targeted adjacency session with the neighboring downstream router in the multipoint LSP. Targeted adjacency module 66 establishes the targeted adjacency session by periodically sending targeted unicast hello messages to the neighboring downstream router over any link between the routers. In this way, even when the protected link goes down, the targeted adjacency session will not go down as long as at least one link remains over which the routers may exchange targeted hello messages.

Targeted adjacency module 66 may also receive a targeted adjacency session label from the downstream router. Upon receiving the P2P LSP label for the P2P LSP with LFA and the targeted adjacency session label from the downstream router of the multipoint LSP, LFA module 74 installs a LFA next hop with label stack 82 for the multipoint LSP in forwarding information 78 with the P2P LSP label as the outer label and the targeted adjacency session label for the multipoint LSP as the inner label of the label stack.

In the case where router 50 comprises a downstream router or leaf of a multipoint LSP, router 50 allocates next hop labels for neighboring upstream routers in the multipoint LSP and may also allocate next hop labels for alternative upstream routers in the P2P LSP with LFA. According to the techniques, when the upstream router requests link protection in the multipoint LSP and the P2P LSP with LFA is established around the protected link, targeted adjacency module 66 in router 50 receives hello messages from the upstream router to establish a targeted adjacency session and allocates a label for the targeted adjacency session to the upstream router. Based on the allocated labels, the upstream router may install primary next hops and LFA next hops with label stacks including the P2P LSP label and the targeted adjacency session label for the multipoint LSP.

As described above with respect to FIG. 2, in order to provide local node protection for a multipoint LSP, the techniques include extensions to mLDP that enable allocation of next next hop labels from a downstream router in a multipoint LSP. In this way, an upstream router may receive both a next hop label for a downstream peer router and a next next hop label for a subsequent downstream router of the multipoint LSP. The upstream router then installs an LFA next hop in its forwarding table with a label stack including the next next hop label for the multipoint LSP and a P2P LSP label for the P2P LSP with LFA around the protected node.

In the case where router 50 comprises an upstream router or root of a multipoint LSP, router 50 establishes the multipoint LSP across a network having two or more downstream routers or leaves. According to the techniques, when router 50 requests node protection in the multipoint LSP and a P2P LSP with LFA is established around the protected node, next next hop capability module 64 sends advertisements to neighboring routers in the network indicating that router 50 is capable of supporting next next hop labels. In addition, next next hop capability module 64 receives advertisements from the neighboring routers in the network indicating that at least some of neighboring routers are capable of supporting next next hop labels.

Upon receiving an advertisement from a downstream router of the multipoint LSP indicating that the downstream router is capable of supporting next next labels, router 50 may send a next next hop Label Request to the downstream router. Upon receiving the advertisement and the next next hop Label Request from router 50, the capable downstream router of the multipoint LSP allocates a next next hop label received from a subsequent downstream router of the multipoint LSP to router 50. In some cases, the capable downstream router allocates a next hop label and the next next hop label to router 50 in the same Label Mapping Message. Next next hop label module 62 recognizes that a next next hop label was received from the downstream router, and installs a LFA next hop with label stack 82 for the multipoint LSP in forwarding information 78 with the P2P LSP label as the outer label and the next next hop label for the multipoint LSP as the inner label of the label stack.

In the case where router 50 comprises a downstream router or leaf of a multipoint LSP, router 50 allocates next hop labels for neighboring upstream routers in the multipoint LSP and may also allocate next hop labels for alternative upstream routers in the P2P LSP with LFA. According to the techniques, when the upstream router requests node protection in the multipoint LSP and the P2P LSP with LFA is established around the protected node, next next hop capability module 64 sends advertisements to neighboring routers in the network indicating that router 50 is capable of supporting next next hop labels. In addition, next next hop capability module 64 receives advertisements from the neighboring routers in the network indicating that at least some of the neighboring routers are capable of supporting next next hop labels.

Upon receiving the advertisement from router 50, an upstream router in the multipoint LSP capable of supporting next next hop labels may send a next next hop Label Request to router 50. Upon receiving the advertisement and the next next hop Label Request from the upstream router, next next hop label module 62 within router 50 sends a next next hop label received from a subsequent downstream router of the multipoint LSP to the capable upstream router of the multipoint LSP that requested next next hop label. In some cases, the router 50 sends a next hop label and the next next hop label to the capable upstream router in the same Label Mapping Message. Based on the received labels, the upstream router may install primary next hops and LFA next hops with label stacks including the P2P LSP label and the next next hop label for the multipoint LSP.

The architecture of router 50 illustrated in FIG. 3 is shown for exemplary purposes only. This disclosure is not limited to this architecture. In other examples, router 50 may be configured in a variety of ways. In one example, some of the functionally of control unit 52 may be distributed within IFCs 56. In another example, control unit 52 may include a routing engine that performs routing functions and maintains routing information base (RIB), e.g., routing information 76, and a forwarding engine that performs packet forwarding based on a forwarding information base (FIB), e.g., forwarding information 78, generated in accordance with the RIB.

Control unit 52 may be implemented solely in software, or hardware, or may be implemented as a combination of software, hardware, or firmware. For example, control unit 52 may include one or more processors which execute software instructions. In that case, the various software modules of control unit 36 may comprise executable instructions stored on a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media.

Figure 4:
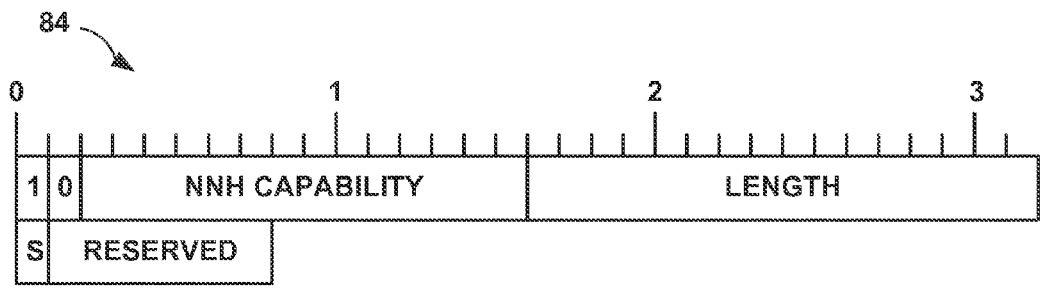
FIG. 4 illustrates an exemplary Next Next Hop (NNH) Capability type-length-value (TLV) used to indicate whether a router supports next next hop labels.

FIG. 4 illustrates an exemplary Next Next Hop (NNH) Capability TLV 84 used to indicate whether a router supports next next hop labels. In accordance with techniques of this disclosure, next next hop label capability is advertised using an LDP Capability TLV that is defined in an LDP Initialization message sent from a router to neighboring routers in a network and indicates a set of capabilities supported by the router. More information about advertising LDP enhancements may be found in Thomas, B., "LDP Capabilities," RFC 5561, July 2009, the entire contents of which are incorporated by reference herein.

The newly defined NNH Capability TLV 84 may indicate the capability of a router to support next next hop label mapping, withdraw, and request procedures. As shown in FIG. 4, NNH Capability TLV 84 includes a TLV type field (in this case NNH Capability), a length field, and a state bit (S). The state bit indicates whether the capability specified by the TLV type is being advertised or withdrawn. The reserved bits may be set to zero on transmission and ignored on receipt.

The usage of LDP Initialization messages for exchanging next next hop label capability implies that a router may exchange LDP Initialization messages with a neighboring router before sending or receiving any other LDP messages with that neighboring router. An upstream router cannot send a NNH Label Request message to downstream routers of a multipoint LDP LSP unless the upstream router knows that at least some of the downstream routers support next next hop label capabilities. In turn, a downstream router cannot send next next hop labels to an upstream router of a multipoint LDP LSP unless the downstream router knows that the upstream router supports next next hop label capabilities. When the NNH Capability TLV 84 is included in the LDP Initialization message, the router is capable of both allocating next next hop labels and receiving next next hop labels. When the NNH Capability TLV 84 is not included in the LDP Initialization message, the router is not capable of either sending or receiving next next hop labels.

Figure 5:
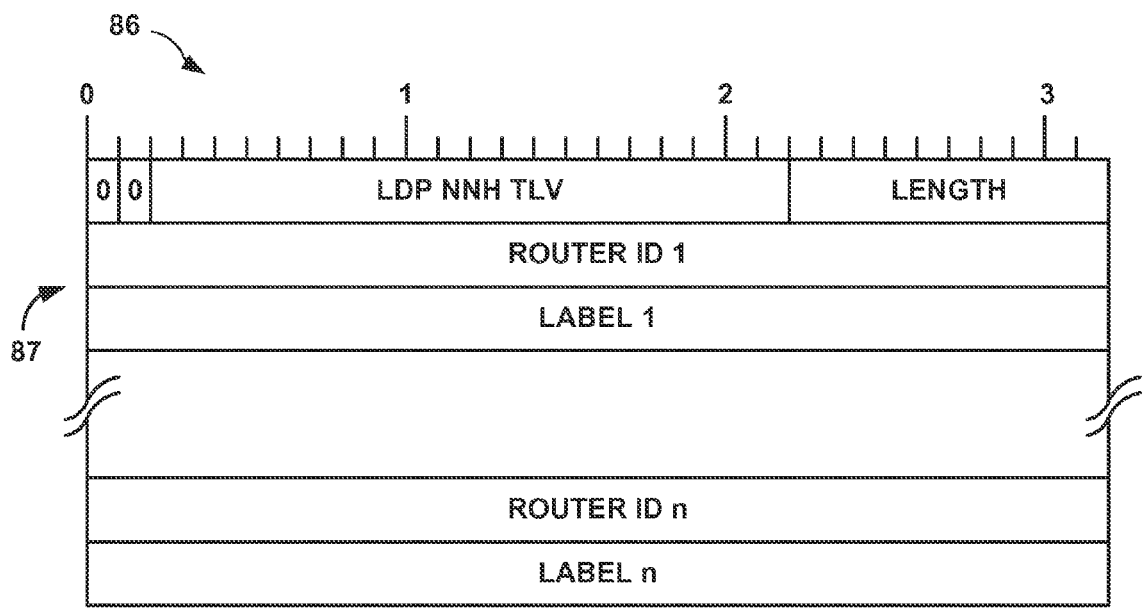
FIG. 5 illustrates an exemplary NNH Label TLV that signals next next hop labels to upstream routers.

FIG. 5 illustrates an exemplary LDP NNH Label TLV 86 that signals next next hop labels to upstream routers. In accordance with the example of FIG. 5, LDP NNH Label TLV 86 is defined in a message used to advertise or withdraw next next hop label mappings. LDP NNH Label TLV 86 is sent in messages from a NNH capable downstream router to a NNH capable upstream router of a multipoint LDP LSP. In some cases the upstream router may have requested a next next hop label from the downstream router using a Label Request message, which is described in more detail in FIG. 6.

As shown in FIG. 5, LDP NNH Label TLV 86 includes a type field (in this case LDP NNH TLV), a length field, and a value field 87. The length field indicates the length of value field 87 in octets. Value field 87 includes at least one pair of a downstream branch router ID and a label advertised by that router. As illustrated in FIG. 5, value field 87 may include a first pair of Router ID 1 and Label 1 through a last pair of Router ID n and Label n, where n indicates a number of downstream branch routers connected to a router capable of allocating the next next hop labels.

In a multipoint LDP LSP, a downstream router may send its label to an upstream peer router in a Label Mapping message. In the case where the downstream router and the upstream router support NNH label capabilities, the downstream router may also send the labels of its downstream branch peer routers to the upstream router using LDP NNH Label TLV 86 included in the same Label Mapping message. The downstream router does not send LDP NNH Label TLV 86 in the Label Mapping message to the upstream router, however, if the downstream router and the upstream router did not advertise the NNH Capability TLV 84 (from FIG. 4) in LDP Initialization messages.

If one of the downstream branch peer router labels is withdrawn or the downstream branch peer router goes down, the NNH capable downstream router may send LDP NNH Label TLV 86 including the particular downstream branch peer router ID with its label in a Label Withdraw message to the NNH capable upstream router. Similarly when a new downstream branch peer router is added to the multipoint LDP LSP, the NNH capable downstream router may send the label of the new downstream branch peer router to the NNH capable upstream router using LDP NNH Label TLV 86 in the Label Mapping message. The NNH capable downstream router may include LDP NNH Label TLV 86 in the optional parameters field of the Label Mapping message or the Label Withdraw message to send or withdraw downstream branch peer router labels to the NNH capable upstream peer router.

Figure 6:
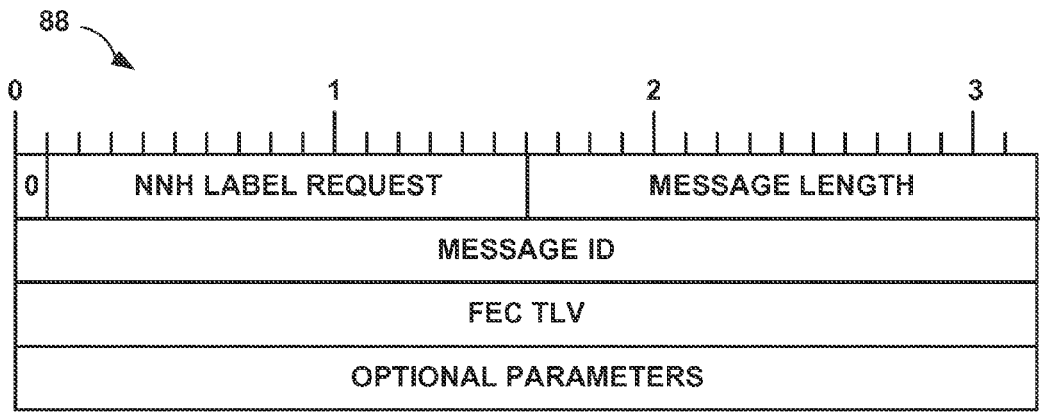
FIG. 6 illustrates an exemplary NNH Label Request TLV that requests next next hop labels from downstream routers.

FIG. 6 illustrates an exemplary NNH Label Request message 88 that requests next next hop labels from downstream routers. In accordance with the techniques of this disclosure, NNH Label Request message 88 is sent from a NNH capable upstream router to a NNH capable downstream router of a multipoint LDP LSP to request next next hop labels of the downstream router's downstream branch peers. An upstream router does not send NNH Label Request message 88 to a downstream router of a multipoint LDP LSP if the upstream router and the downstream router did not advertise the NNH Capability TLV 84 (from FIG. 4) in LDP Initialization messages.

The encoding for NNH Label Request message 88 may be the same as a standard next hop Label Request message. As shown in FIG. 6, NNH Label Request message 88 includes a type field (in this case NNH Label Request), a message length field, a message ID field, a FEC TLV field to indentify a particular multipoint LDP LSP, and an optional parameters field.

If the NNH capable downstream router does not have a next next hop label for a particular prefix, it can send an appropriate notification message to the NNH capable upstream peer. If NNH label request message 88 is used for a P2P LDP LSP downstream router on demand, it is assumed that the next next hop router uses a global label for LDP.

Figure 7:
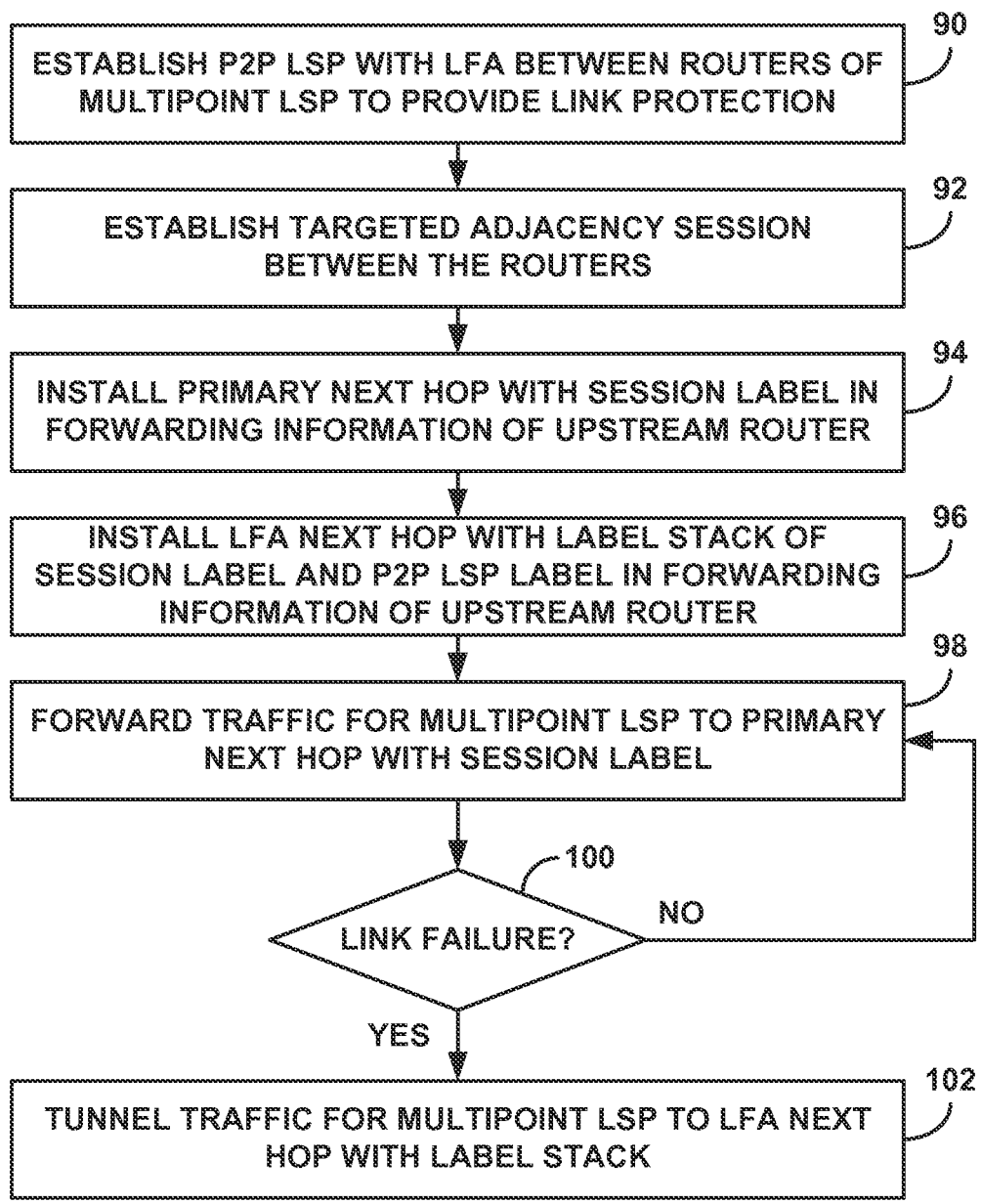
FIG. 7 is a flowchart illustrating an exemplary operation of providing link protection for traffic in a multipoint LSP using a P2P LSP with LFA.

FIG. 7 is a flowchart illustrating an exemplary operation of providing link protection for traffic in a multipoint LSP using a P2P LSP with LFA next hops. The exemplary operation is described herein with respect to upstream transit router 15 from FIG. 1 that requests local protection for multicast traffic on link 20 of multipoint LSP 12. Upstream router 15 uses P2P LFA LSP 24 to tunnel the multicast traffic to downstream transit router 16 in the event of a failure of link 20 between upstream router 15 and downstream router 16. During the FRR using P2P LFA LSP 24, downstream router 16 may converge and signal a new multipoint branch for multipoint LSP 12 based on the new network topology without link 20.

In the illustrated example of FIG. 1, root router 14 establishes multipoint LSP 12 through network 10 from root router 14 to leaf routers 18A & 18B via transit routers 15, 16. As described above with respect to FIG. 1, using the LDP, the multipoint LSP setup is initiated by leaf routers 18 and propagated upstream along the shortest upstream path toward root router 14. The label mapping messages are downstream-assigned such that each downstream router assigns itself a label and sends a label mapping message for multipoint LSP 12 to its selected upstream router. In some cases, one or more of the upstream routers may establish alternate paths for the multicast traffic to reach the downstream routers in the event of a failure in multipoint LDP LSP 12. For example, the upstream routers may establish P2P LSPs with LFA next hops calculated to be the backup shortest downstream paths toward leaf routers 18.

According to the techniques of this disclosure, upstream router 15 establishes P2P LSP with LFA 24 between upstream router 15 and downstream router 16 of multipoint LDP LSP 12 to provide link protection for link 20 (90). In the illustrated example of FIG. 1, P2P LSP with LFA 24 may be established from transit router 15 to transit router 16 via transit router 17. P2P LSP with LFA 24 may comprise a simple point-to-point (P2P) LDP LSP with no LDP enhancements. Downstream router 16 may initiate the LSP setup and send an implicit null label to alternate upstream transit router 17. Transit router 17, in turn, may send a label mapping message with a P2P LSP label to upstream router 15.

Transit router 15 then establishes targeted adjacency session 22 between transit router 15 and transit router 16 (92). For example, transit router 15 may establish targeted adjacency session 22 by periodically sending targeted unicast hello messages to transit router 16 over any link between transit router 15 and transit router 16. In this way, targeted adjacency session 22 will not go down as long as at least one link remains between transit router 15 and transit router 16 over which the routers may exchange targeted hello messages.

Transit router 15 installs a primary next hop with a targeted adjacency session label for multipoint LSP 12 in the forwarding information of upstream transit router 15 (94). Transit router 15 also installs a LFA next hop with a label stack in the forwarding information of upstream transit router 15 where the label stack includes the targeted adjacency session label for multipoint LSP 12 and the P2P LSP label (96).

After the primary and LFA next hops are installed in the forwarding information, upstream transit router 15 forwards multicast traffic along multipoint LSP 12 to the primary next hop with the targeted adjacency session label (98). Upon detecting that a link failure has occurred affecting the primary next hop (YES branch of 100), upstream transit router 15 begins tunneling the multicast traffic to downstream transit router 16 along the P2P LSP with LFA 24 to the LFA next hop with the label stack (102). While the multicast traffic is tunneled using P2P LSP 24, downstream transit node 16 will converge and signal a new branch for multipoint LDP LSP 12 based on the changed network topology.

Figure 8:
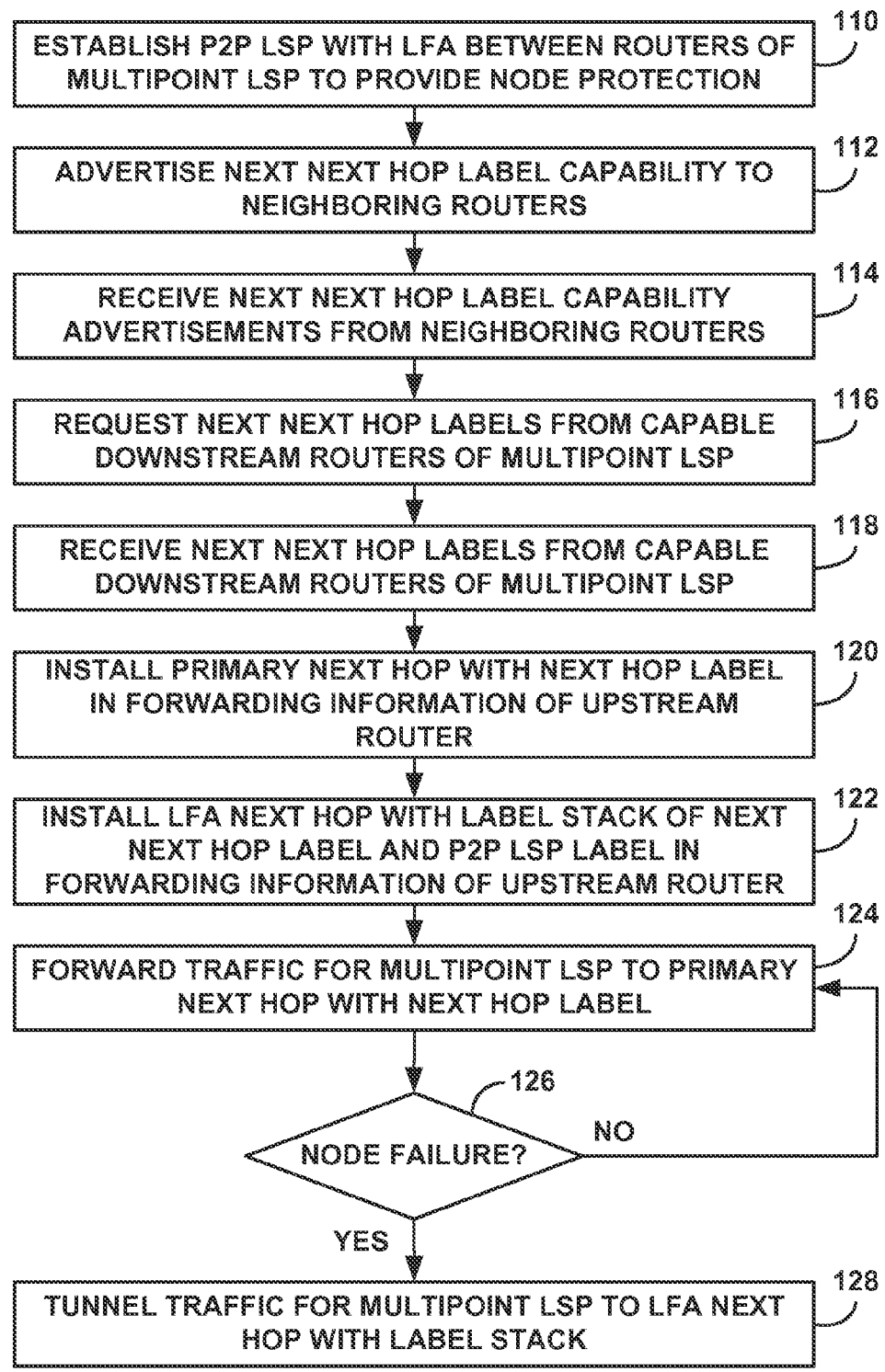
FIG. 8 is a flowchart illustrating an exemplary operation of providing node protection for traffic in a multipoint LSP using a P2P LSP with LFA.

FIG. 8 is a flowchart illustrating an exemplary operation of providing node protection for traffic in a multipoint LSP using a P2P LSP with LFA. The exemplary operation is described herein with respect to upstream root router 34 from FIG. 2 that requests local protection for multicast traffic through transit router 35 of multipoint LSP 32. Upstream router 34 uses P2P LFA LSP 44 to tunnel the multicast traffic to around transit router 34 to downstream transit router 36 in the event of a failure of intermediate router 35 between upstream router 34 and downstream router 36. During the FRR using P2P LFA LSP 34, downstream router 36 may converge and signal a new multipoint branch for multipoint LSP 32 based on the new network topology without router 35.

In the illustrated example of FIG. 2, root router 34 establishes multipoint LSP 32 through network 30 from root router 34 to leaf routers 38A & 38B via transit routers 35, 36. As described above with respect to FIG. 2, using the LDP, the multipoint LSP setup is initiated by leaf routers 38 and propagated upstream along the shortest upstream path toward root router 34. The label mapping messages are downstream-assigned such that each downstream router assigns itself a label and sends a label mapping message for multipoint LSP 32 to its selected upstream router. In some cases, one or more of the upstream routers may establish alternate paths for the multicast traffic to reach the downstream routers in the event of a failure in multipoint LDP LSP 32. For example, the upstream routers may establish P2P LSPs with LFA next hops calculated to be the backup shortest downstream path toward leaf routers 38.

According to the techniques of this disclosure, upstream root router 34 establishes P2P LSP with LFA 44 between upstream router 34 and downstream router 36 of multipoint LDP LSP 32 to provide node protection for transit router 35 (110). In the illustrated example of FIG. 2, P2P LSP with LFA 44 may be established from root router 34 to transit router 36 via transit router 37. P2P LSP with LFA 44 may comprise a simple P2P LDP LSP with no LDP enhancements. Downstream router 36 may initiate the LSP setup and send an implicit null label to alternate upstream transit router 37. Transit router 37, in turn, may send a label mapping message with a P2P LSP label to upstream root router 34.

Root router 34 then advertises its next next hop label capability to its neighboring routers, e.g., transit router 35 and transit router 37, in network 10 (112). Root router 34 may use NNH Capability TLV 84 from FIG. 4 in a LDP Capability TLV to advertise its support of next next hop label mapping, withdraw, and request procedures. Root router 34 also receives next next hop label capability advertisements from one or more of its neighboring routers that support next next hop label capabilities (114). For example, root router 34 may receive a LDP Capability TLV including NNH Capability TLV 84 from transit router 35 advertising support of next next hop label mapping, withdraw, and request procedures.

After receiving the next next hop label capability advertisements, upstream root router 34 requests next next hop labels for multipoint LSP 32 from NNH capable downstream router 35 (116). For example, upstream router 34 may use NNH Label Request message 88 from FIG. 6 to request a next next hop label from intermediate router 35 for downstream router 36 in multipoint LSP 32. In response to the request, upstream router 34 receives next next hop labels for multipoint LSP 32 from NNH capable downstream router 35 (118). For example, upstream router 34 may receive LDP NNH Label TLV 86 from FIG. 5 from intermediate router 35 including a next next hop label for downstream router 36 in multipoint LSP 32. In some cases, both the next hop label and the next next hop label for multipoint LSP 32 may be included in a label mapping message sent from intermediate router 35 to upstream root router 34.

Upstream root router 34 installs a primary next hop with the next hop label for multipoint LSP 32 in the forwarding information of upstream router 34 (120). Upstream router 34 also installs a LFA next hop with a label stack in the forwarding information of upstream root router 34 where the label stack includes the next next hop label for multipoint LSP 32 and the P2P LSP label (122).

After the primary and LFA next hops are installed in the forwarding information, upstream root router 34 forwards multicast traffic along multipoint LSP 32 to the primary next hop with the next hop label for multipoint LSP 32 (124). Upon detecting that a node failure has occurred affecting the primary next hop (YES branch of 126), upstream root router 34 begins tunneling the multicast traffic around failed intermediate router 35 along the P2P LSP with LFA 44 to the LFA next hop with the label stack (128). While the multicast traffic is tunneled using P2P LSP 44, downstream transit node 36 will converge and signal a new branch for multipoint LDP LSP 32 based on the changed network topology.

Various examples of the techniques of the disclosure have been described. These and other examples are within the scope of the following claims.

The invention claimed is:

1. A method comprising:
  establishing, with an upstream router using multicast extensions to Label Distribution Protocol (mLDP), a multipoint label switched path (LSP) between at least one root router and two or more leaf routers, the multipoint LSP including a direct link as a primary path between the upstream router and a downstream router;
  establishing, with the upstream router using a Label Distribution Protocol (LDP), a point-to-point (P2P) LSP to the downstream router as a backup path between the upstream router and the downstream router, wherein the P2P LSP avoids the direct link between the upstream router and the downstream router that is a protected link of the multipoint LSP;
  establishing, with the upstream router using the mLDP, a targeted adjacency session between the upstream router and the downstream router, wherein a targeted adjacency session label associated with the multipoint LSP is allocated for the targeted adjacency session by the downstream router;
  installing a primary next hop with an associated primary label for the primary path of the multipoint LSP into forwarding information of the upstream router, wherein the primary label includes the targeted adjacency session label associated with the multipoint LSP;
  installing an alternate next hop with an associated alternate label stack for the backup path of the P2P LSP into forwarding information of the upstream router, wherein the alternate label stack includes a P2P LSP label associated with the P2P LSP and the targeted adjacency session label associated with the multipoint LSP;
  forwarding multicast traffic from the upstream router toward the downstream router along the multipoint LSP according to the primary next hop with the primary label; and
  upon detecting a failure of the protected link of the multipoint LSP, tunneling the multicast traffic from the upstream router toward the downstream router along the P2P LSP according to the alternate next hop with the associated alternate label stack.

2. The method of claim 1,
  wherein, upon detecting a failure of the protected link, tunneling the multicast traffic comprises tunneling the multicast traffic toward the downstream router along the P2P LSP according to the alternate next hop with the associated alternate label stack including the P2P LSP label as an outer label and the targeted adjacency session label as an inner label.

3. The method of claim 1, wherein the P2P LSP comprises a P2P LSP with loop-free alternate (LFA) next hops.

4. The method of claim 1, wherein the multipoint LSP comprises one of a point-to-multipoint (P2MP) LSP and a multipoint-to-multipoint (MP2MP) LSP.

5. A method comprising:
  establishing, with an upstream router using multicast extensions to Label Distribution Protocol (mLDP), a multipoint label switched path (LSP) between at least one root router and two or more leaf routers, the multipoint LSP including an intermediate router along a primary path between the upstream router and a downstream router;
  establishing, with the upstream router using Label Distribution Protocol (LDP), a point-to-point (P2P) LSP to the downstream router as a backup path between the upstream router and the downstream router, wherein the P2P LSP avoids the intermediate router of the multipoint LSP between the upstream router and the downstream router that is a protected node of the multipoint LSP;
  sending, by the upstream router using the mLDP, a next next hop label request to the intermediate router of the multipoint LSP, wherein the next next hop label request is a message that requests from the intermediate router a next next hop label that is allocated for the multipoint LSP by the downstream router, and wherein the downstream router is a next next hop router of the upstream router;

in response to the next next hop label request, receiving, by the upstream router using the mLDP, the next next hop label allocated by the downstream router from the intermediate router;
installing a primary next hop with an associated primary label for the primary path of the multipoint LSP into forwarding information of the upstream router, wherein the primary label includes a next hop label that is allocated for the multipoint LSP by the intermediate router;
installing an alternate next hop with an associated alternate label stack for the backup path of the P2P LSP into the forwarding information of the upstream router, wherein the alternate label stack includes a P2P LSP label associated with the P2P LSP and the next next hop label associated with the multipoint LSP;
forwarding multicast traffic from the upstream router toward the downstream router along the multipoint LSP according to the primary next hop with the primary label; and
upon detecting a failure of the protected node of the multipoint LSP, tunneling the multicast traffic from the upstream router toward the downstream router along the P2P LSP according to the alternate next hop with the associated alternate label stack.

6. The method of claim 5,
wherein, upon detecting a failure of the protected node, tunneling the multicast traffic comprises tunneling the multicast traffic toward the downstream router along the P2P LSP according to the alternate next hop with the associated alternate label stack including the P2P LSP label as an outer label and the next next hop label as an inner label.

7. The method of claim 5, further comprising:
advertising, by the upstream router using the mLDP, a next next hop label capability to the intermediate router of the multipoint LSP indicating that the upstream router supports next next hop labels; and
receiving, by the upstream router using the mLDP, a next next hop label capability advertisement from the intermediate router indicating that the intermediate router supports next next hop labels.

8. The method of claim 5, further comprising:
advertising, by the upstream router using the mLDP, a next next hop label capability to neighboring routers indicating that the upstream router supports mapping, withdraw, and request procedures for a next next hop label; and
receiving, by the upstream router using the mLDP, a next next hop label capability advertisement from one or more of the neighboring routers indicating that the one or more neighboring routers supports mapping, withdraw, and request procedures for a next next hop label.

9. The method of claim 8, further comprising:
sending, with the upstream router using the mLDP, a next next hop label request to at least one of the capable neighboring routers; and
in response to the request, receiving, with the upstream router using the mLDP, a next next hop label from the one of the capable neighboring routers.

10. The method of claim 8, further comprising:
receiving, with the upstream router using the mLDP, a next next hop label request from at least one of the capable neighboring routers; and
in response to the request, sending, with the upstream router using the mLDP, a next next hop label from the upstream router to the one of the capable neighboring routers.

11. The method of claim 5, wherein the P2P LSP comprises a P2P LSP with loop-free alternate (LFA) next hops.

12. The method of claim 5, wherein the multipoint LSP comprises one of a point-to-multipoint (P2MP) LSP and a multipoint-to-multipoint (MP2MP) LSP.

13. An upstream router of a multipoint label switched path (LSP) comprising:
forwarding information that stores a primary next hop with an associated primary label for a primary path of the multipoint LSP and an alternate next hop with an associated alternate label stack for a backup path of a point-to-point (P2P) LSP;
a control unit configured to:
establish, using multicast extensions to Label Distribution Protocol (mLDP), the multipoint LSP between at least one root router and two or more leaf routers, the multipoint LSP including a direct link as the primary path between the upstream router and a downstream router,
establish, using Label Distribution Protocol (LDP), the P2P LSP to the downstream router as the backup path between the upstream router and the downstream router, wherein the P2P LSP avoids the direct link between the upstream router and the downstream router that is a protected link of the multipoint LSP,
establish, using the mLDP, a targeted adjacency session between the upstream router and the downstream router, wherein a targeted adjacency session label associated with the multipoint LSP is allocated for the targeted adjacency session by the downstream router,
install the primary next hop with the associated primary label for the primary path of the multipoint LSP into the forwarding information, wherein the primary label includes the targeted adjacency session label associated with the multipoint LSP, and
install the alternate next hop with the associated alternate label stack for the backup path of the P2P LSP into the forwarding information, wherein the alternate label stack includes a P2P LSP label associated with the P2P LSP and the targeted adjacency session label associated with the multipoint LSP; and
one or more interface cards configured to:
forward multicast traffic toward the downstream router along the multipoint LSP according to the primary next hop with the primary label, and
upon the control unit detecting a failure of the protected link of the multipoint LSP, tunnel the multicast traffic toward the downstream router along the P2P LSP according to the alternate next hop with the associated alternate label stack.

14. The upstream router of claim 13, wherein, upon the control unit detecting a failure of the protected link, the one or more interface cards tunnel the multicast traffic toward the downstream router along the P2P LSP according to the alternate next hop with the associated alternate label stack including the P2P LSP label as an outer label and the targeted adjacency session label as an inner label.

15. The upstream router of claim 13, wherein the P2P LSP comprises a P2P LSP with loop-free alternate (LFA) next hops.

16. The upstream router of claim 13, wherein the multipoint LSP comprises one of a point-to-multipoint (P2MP) LSP and a multipoint-to-multipoint (MP2MP) LSP.

17. An upstream router of a multipoint label switched path (LSP) comprising:
forwarding information that stores a primary next hop with an associated primary label for a primary path of the multipoint LSP and an alternate next hop with an associated alternate label stack for a backup path of a point-to-point (P2P) LSP;
a control unit configured to:
establish, using multicast extensions to Label Distribution Protocol (mLDP), a multipoint LSP between at least one root router and two or more leaf routers, the multipoint LSP including an intermediate router along the primary path between the upstream router and a downstream router,
establish, using Label Distribution Protocol (LDP), the P2P LSP to the downstream router as the backup path between the upstream router and the downstream router, wherein the P2P LSP avoids the intermediate router of the multipoint LSP between the upstream router and the downstream router that is a protected node of the multipoint LSP,
send, using the mLDP, a next next hop label request to the intermediate router of the multipoint LSP, wherein the next next hop label request is a message that requests from the intermediate router a next next hop label that is allocated for the multicast LSP by the downstream router, wherein the downstream router is a next next hop router of the upstream router,
in response to the next next hop label request, receive, using the mLDP, the next next hop label allocated by the downstream router from the intermediate router,
install the primary next hop with the associated primary label for the primary path of the multipoint LSP into forwarding information of the upstream router, wherein the primary label includes a next hop label that is allocated for the multipoint LSP by the intermediate router, and
install the alternate next hop with the associated alternate label stack for the backup path of the P2P LSP into the forwarding information, wherein the label stack includes a P2P LSP label associated with the P2P LSP and the next next hop label associated with the multipoint LSP; and
one or more interface cards configured to:
forward multicast traffic toward the downstream router along the multipoint LSP according to the primary next hop with the primary label, and
upon the control unit detecting a failure of the protected node of the multipoint LSP, tunnel the multicast traffic toward the downstream router along the P2P LSP according to the alternate next hop with the associated alternate label stack.

18. The upstream router of claim 17, wherein, upon the control unit detecting a failure of the protected node, the one or more interface cards tunnel the multicast traffic toward the downstream router along the P2P LSP according to the alternate next hop with the associated alternate label stack including the P2P LSP label as an outer label and the next next hop label as an inner label.

19. The upstream router of claim 17, wherein the control unit:
advertises, using the mLDP, a next next hop label capability to the intermediate router of the multipoint LSP indicating that the upstream router supports next next hop labels; and
receives, using the mLDP, a next next hop label capability advertisement from the intermediate router indicating that the intermediate router supports next next hop labels.

20. The upstream router of claim 17, wherein, the control unit:
advertises, using the mLDP, a next next hop label capability to neighboring routers indicating that the upstream router supports mapping, withdraw, and request procedures for a next next hop label; and
receives, using the mLDP, a next next hop label capability advertisement from one or more of the neighboring routers indicating that the one or more neighboring routers supports mapping, withdraw, and request procedures for a next next hop label.

21. The upstream router of claim 20, wherein, the control unit:
sends, using the mLDP, a next next hop label request to at least one of the capable neighboring routers; and
in response to the request, receives, using the mLDP, a next next hop label from the one of the capable neighboring routers.

22. The upstream router of claim 20, wherein, the control unit:
receives, using the mLDP, a next next hop label request from at least one of the capable neighboring routers; and
in response to the request, sends, using the mLDP, a next next hop label from the upstream router to the one of the capable neighboring routers.

23. The upstream router of claim 17, wherein the P2P LSP comprises a P2P LSP with loop-free alternate (LFA) next hops.

24. The upstream router of claim 17, wherein the multipoint LSP comprises one of a point-to-multipoint (P2MP) LSP and a multipoint-to-multipoint (MP2MP) LSP.

25. A non-transitory computer-readable storage medium comprising program instructions for causing a programmable processor to:
establish, with an upstream router using multicast extensions to Label Distribution Protocol (mLDP), a multipoint label switched path (LSP) between at least one root router and two or more leaf routers, the multipoint LSP including a direct link as a primary path between the upstream router and a downstream router;
establish, with the upstream router using Label Distribution Protocol (LDP), a point-to-point (P2P) LSP to the downstream router as a backup path between the upstream router and the downstream router, wherein the P2P LSP avoids the direct link between the upstream router and the downstream router that is a protected link of the multipoint LSP;
establish, with the upstream router using the mLDP, a targeted adjacency session between the upstream router and the downstream router, wherein a targeted adjacency session label associated with the multipoint LSP is allocated for the targeted adjacency session by the downstream router;
install a primary next hop with an associated primary label for the primary path of the multipoint LSP into forwarding information of the upstream router, wherein the primary label includes the targeted adjacency session label associated with the multipoint LSP;
install an alternate next hop with an associated alternate label stack for the backup path of the P2P LSP into forwarding information of the upstream router, wherein the alternate label stack includes a P2P LSP label associated with the P2P LSP and the targeted adjacency session label associated with the multipoint LSP;
forward multicast traffic from the upstream router toward the downstream router along the multipoint LSP according to the primary next hop with the primary label; and
upon detecting a failure of the protected link of the multipoint LSP, tunnel the multicast traffic from the upstream router toward the downstream router along the P2P LSP according to the alternate next hop with the associated alternate label stack.

26. A non-transitory computer-readable storage medium comprising program instructions for causing a programmable processor to:

establish, with an upstream router using multipoint extensions to Label Distribution Protocol (mLDP), a multipoint label switched path (LSP) between at least one root router and two or more leaf routers, the multipoint LSP including an intermediate router along a primary path between the upstream router and a downstream router;

establish, with the upstream router using Label Distribution Protocol (LDP), a point-to-point (P2P) LSP to the downstream router as a backup path between the upstream router and the downstream router, wherein the P2P LSP avoids the intermediate router of the multipoint LSP between the upstream router and the downstream router that is a protected node of the multipoint LSP;

send, by the upstream router using the mLDP, a next next hop label request to the intermediate router of the multipoint LSP, wherein the next next hop label request is a message that requests from the intermediate router a next next hop label that is allocated for the multipoint LSP by the downstream router, and wherein the downstream router is a next next hop router of the upstream router;

in response to the next next hop label request, receive, by the upstream router using the mLDP, the next next hop label allocated by the downstream router from the intermediate router;

install a primary next hop with an associated primary label for the primary path of the multipoint LSP into forwarding information of the upstream router, wherein the primary label includes a next hop label that is allocated for the multipoint LSP by the intermediate router;

install an alternate next hop with an associated alternate label stack for the backup path of the P2P LSP into the forwarding information of the upstream router, wherein the alternate label stack includes a P2P LSP label associated with the P2P LSP and the next next hop label associated with the multipoint LSP;

forward multicast traffic from the upstream router toward the downstream router along the multipoint LSP according to a primary next hop with the primary label; and upon detecting a failure of the protected node of the multipoint LSP, tunnel the multicast traffic from the upstream router toward the downstream router along the P2P LSP according to the alternate next hop with the associated alternate label stack.

* * * * *